United States Patent
Chang et al.

(10) Patent No.: US 11,197,169 B2
(45) Date of Patent: Dec. 7, 2021

(54) DEVICE AND METHOD FOR OPERATING BEAMFORMING IN WIRELESS COMMUNICATION SYSTEM

(71) Applicant: Samsung Electronics Co., Ltd., Suwon-si (KR)

(72) Inventors: Sanghyun Chang, Seoul (KR); Sungrok Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/648,523

(22) PCT Filed: Dec. 15, 2017

(86) PCT No.: PCT/KR2017/014792
§ 371 (c)(1),
(2) Date: Mar. 18, 2020

(87) PCT Pub. No.: WO2019/054575
PCT Pub. Date: Mar. 21, 2019

(65) Prior Publication Data
US 2020/0267567 A1     Aug. 20, 2020

(30) Foreign Application Priority Data
Sep. 18, 2017   (KR) .......................... 10-2017-0119790

(51) Int. Cl.
*H04W 16/18*       (2009.01)
*H04W 16/28*       (2009.01)
(Continued)

(52) U.S. Cl.
CPC ........... *H04W 16/18* (2013.01); *H04W 16/28* (2013.01); *H04W 24/02* (2013.01); *H04W 24/10* (2013.01)

(58) Field of Classification Search
CPC combination set(s) only.
See application file for complete search history.

(56) References Cited

U.S. PATENT DOCUMENTS 9,420,474 B1 *  8/2016  Pawar .................... H04W 16/28
9,648,536 B2 *  5/2017  Kang ..................... H04W 36/30
(Continued)

FOREIGN PATENT DOCUMENTS

KR    10-2014-0002403 A    1/2014
KR    10-2014-0090495 A    7/2014
(Continued)

OTHER PUBLICATIONS

Extended European Search Report dated Jul. 7, 2020, issued in European Patent Application No. 17924909.9.
(Continued)

*Primary Examiner* — Julio R Perez
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). According to various embodiments of the present disclosure, an operating device connected to at least one base station in a wireless communication system comprises at least one transmitter-receiver and at least one processor connected to the at least one transmitter-receiver, wherein the at least one processor can determine a coverage formed by beams of the at least one base station and change a beam operation configuration for the at least one base station when the number of beams, which can be provided to a terminal, is greater than or equal to a threshold value or another terminal is positioned outside the coverage. This study was conducted with the support of the "Cross-Ministry Giga KOREA Project" by the government (Ministry of Science, Technology and Infor-
(Continued)

mation) in 2017 (No. GK17N0100, Development of Millimeter Wave 5G Mobile Communication System).

20 Claims, 13 Drawing Sheets

(51) Int. Cl.
*H04W 24/02* (2009.01)
*H04W 24/10* (2009.01)

(56) References Cited

U.S. PATENT DOCUMENTS

| | | | |
|---|---|---|---|
| 10,123,218 B1* | 11/2018 | Yang | ............ H04W 60/04 |
| 10,954,607 B1* | 3/2021 | Antipov | ............ C30B 29/04 |
| 2004/0072545 A1 | 4/2004 | Hamalainen et al. | |
| 2005/0261028 A1 | 11/2005 | Chitrapu | |
| 2012/0276901 A1 | 11/2012 | Kruglick | |
| 2014/0004869 A1 | 1/2014 | Jung | |
| 2014/0313090 A1 | 10/2014 | Oh et al. | |
| 2015/0009080 A1 | 1/2015 | Oh et al. | |
| 2015/0200452 A1 | 7/2015 | Oh et al. | |
| 2017/0040687 A1 | 2/2017 | Matitsine et al. | |
| 2017/0201892 A1 | 7/2017 | Wen et al. | |

FOREIGN PATENT DOCUMENTS

| | | |
|---|---|---|
| WO | 2012/152306 A1 | 11/2012 |
| WO | 2017/133772 A1 | 8/2017 |

OTHER PUBLICATIONS

Korean Office Action dated Jun. 11, 2021, issued in Korean Application No. 10-2017-0119790.

* cited by examiner

DEVICE AND METHOD FOR OPERATING BEAMFORMING IN WIRELESS COMMUNICATION SYSTEM

TECHNICAL FIELD

The disclosure generally relates to a wireless communication system and, more particularly, to a device and a method for operating beamforming in a wireless communication system.

This study was conducted with the support of the "Cross-Ministry Giga KOREA Project" by the government (Ministry of Science, Technology and Information) in 2017 (No. GK17N0100, Development of Millimeter Wave 5G Mobile Communication System).

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G communication system is operating to increase a signal gain by using a beamforming technique in order to overcome the problem of path loss due to the characteristics of an ultra-high frequency band (e.g., mmWave). Meanwhile, according to spatially limited characteristics of beams, serviceable beams may be sufficient in some regions, while serviceable beams may be insufficient in other regions. The problem of service outage due to insufficient beams or inefficiency due to excess beams may occur.

DISCLOSURE OF INVENTION

Technical Problem

Based on the discussion as described above, the disclosure provides a device and a method for an optimal network environment in a wireless communication system.

In addition, the disclosure provides a device and a method for optimal beamforming operation in a wireless communication system.

In addition, the disclosure provides a device and a method for increasing beamforming efficiency in a wireless communication system.

In addition, the disclosure provides a device and a method for designing an optimal network according to an environmental change in a wireless communication system.

In addition, the disclosure provides a device and a method for increasing a beam coverage in a wireless communication system.

In addition, the disclosure provides a device and a method for changing a beamforming operation configuration in a wireless communication system.

Solution to Problem

According to various embodiments of the disclosure, an operating device connected to at least one base station in a wireless communication system may include at least one transceiver and at least one processor coupled to the at least one transceiver, wherein the at least one processor is configured to determine a coverage of beams of the at least one base station, and change a beam operation configuration for the at least one base station when the number of beams which can be provided to a terminal is greater than or equal to a threshold value, or another terminal is located outside the coverage.

According to various embodiments of the disclosure, a device of a base station in a wireless communication system may include at least one transceiver and at least one processor coupled to the at least one transceiver, wherein the at least one processor is configured to determine a coverage of beams of the base station, based on a measurement report received from each of terminals connected to the base station, and change a beam operation configuration for the base station when the number of beams which can be provided to a terminal is greater than or equal to a threshold value, or another terminal is located outside the coverage.

According to various embodiments of the disclosure, a method for an operating device connected to at least one base station in a wireless communication system may include: determining a coverage of beams of the at least one base station; and changing a beam operation configuration for the at least one base station when the number of beams which can be provided to a terminal is greater than or equal to a threshold value, or another terminal is located outside the coverage.

According to various embodiments of the disclosure, a method for a base station in a wireless communication system may include: determining a coverage of beams of the base station, based on a measurement report received from each of terminals connected to the base station; and changing a beam operation configuration for the base station when the number of beams which can be provided to a terminal is greater than or equal to a threshold value, or another terminal is located outside the coverage.

Advantageous Effects of Invention

A device and a method according to various embodiments of the disclosure can provide an efficient beamforming network environment by changing a beamforming configuration according to a change in a situation.

Effects which can be acquired by the disclosure are not limited to the above described effects, and other effects that have not been mentioned may be clearly understood by those skilled in the art to which the disclosure belongs from the following description.

BEST MODE FOR CARRYING OUT THE INVENTION

The terms used in the disclosure are only used to describe specific embodiments, and are not intended to limit the disclosure. A singular expression may include a plural expression unless they are definitely different in context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the terms defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to a device and a method for configuring a beamforming network in a wireless communication system. Specifically, the disclosure describes a technology for configuring a beamforming network by itself according to an environmental change in a wireless communication system.

Terms referring to expressions related to information used in the following description (e.g., measurement information, signal information, coverage information, and beam control information), terms referring to network entities (e.g., a network node and a transmission/reception point (TRP)), terms referring to a state of a network environment (e.g., beam deficiency, beam overflow (or beam overcrowding), and a beam reasonable state), terms referring to elements of a device, and the like are illustrated for convenience of description. Therefore, the disclosure is not limited to the terms described below, and other terms having equivalent technical meanings may be used.

In addition, the disclosure describes various embodiments by using terms used in some communication standards (e.g., 3rd generation partnership project (3GPP)), but this is only an example for description. Various embodiments of the disclosure may be easily modified and applied in other communication systems.

Figure 1:
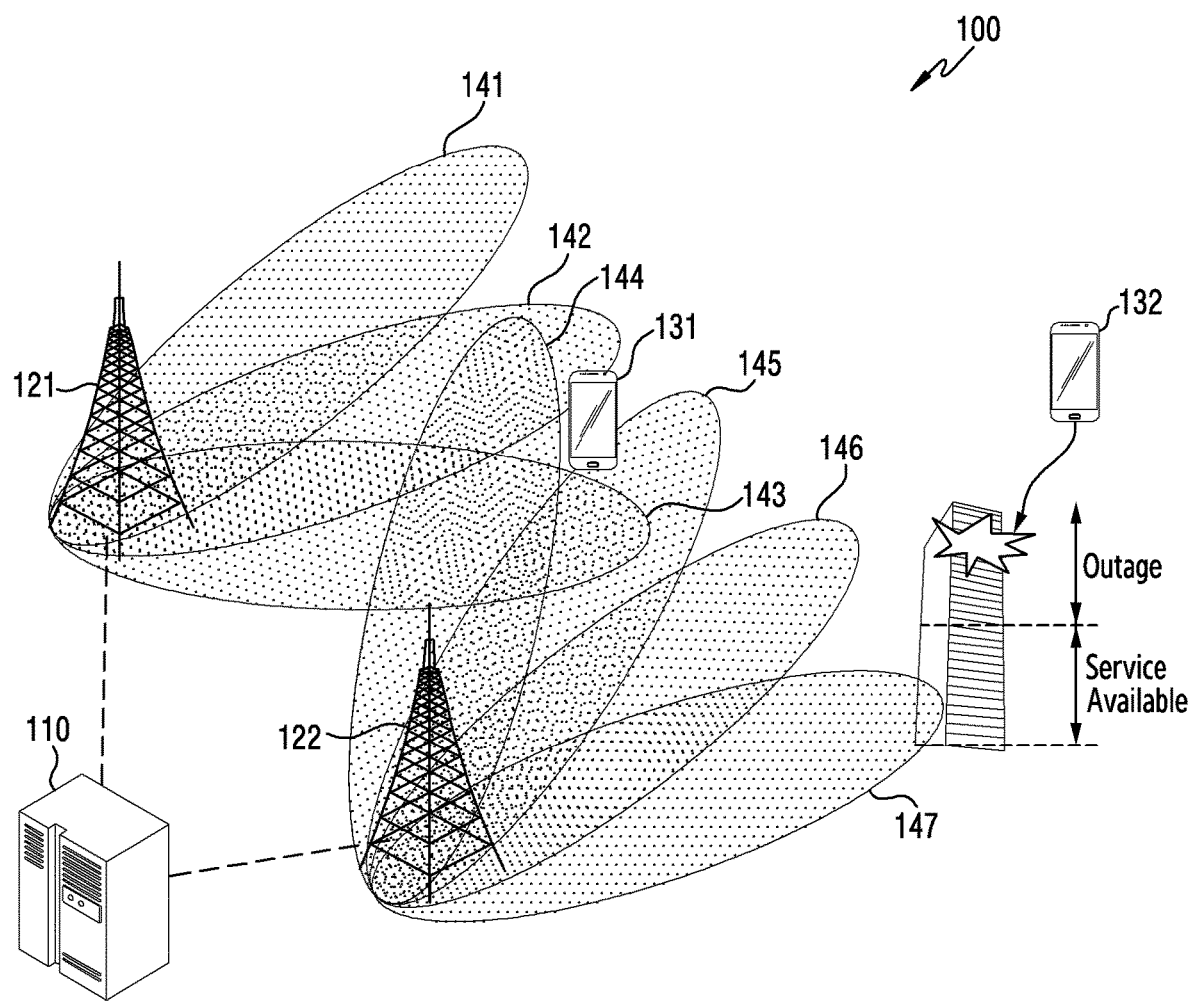
FIG. 1 illustrates a wireless communication system according to various embodiments of the disclosure.

FIG. 1 illustrates a wireless communication system according to various embodiments of the disclosure. FIG. 1 illustrates a beamforming network operating device 110, a first base station 121, a second base station 122, a first terminal 131, and a second terminal 132 as a part of nodes using a wireless channel in a wireless communication environment 100. The wireless communication environment 100 indicates a network environment configured through beamforming. Hereinafter, the term "cell" used herein may refer to a service range in a base station. The base station may cover one cell or multiple cells. A plurality of cells may be classified by a frequency supported by a cell or an area of a sector covered by a cell. In the following description, a base station may be used as a term including a cell, or a cell may be used as a term referring to a base station. A serving cell may be a cell which provides upper layer signaling (e.g., radio resource control (RRC) signaling) with a terminal and may indicate one cell or a plurality of cells.

Referring to FIG. 1, the beamforming network operating device 110 may be a device for configuring a beamforming operation. The beamforming network operating device 110 may be referred to as a self-organizing beamforming (SOB) control device, a beamforming network configuration device, a beamforming network design device, and a beam organizer, a beam deployment device, a beam management device, a beam balancing device, or an operating device. Hereinafter, the beamforming network operating device 110 is referred to as an operating device 110 and described.

The operating device 110 may be a device for configuring an optimal beamforming network environment by controlling beamforming by each base station. The operating device 110 may determine an area coverable by each base station through beamforming, that is, a beam coverage. The operating device 110 may determine the beam coverage to track a network environment change. The operating device 110 may determine a region in which service is not available through the beam coverage, a region in which a large number of beams are provided compared to the demand, an area of a beam with less usage, and the like, and accordingly, redesign a beamforming network environment. Hereinafter, the disclosure describes the beamforming operating device 110 performing operations for determining a beam coverage of each base station and reconfiguring a beamforming network, but is not limited thereto. Some operations for determining a beam coverage of each base station or reconfiguring a beamforming network according to various embodiments may be performed by a base station described later (e.g., a first base station 121 and a second base station 122) or performed by a device of a node higher than the beamforming operating device 110.

The first base station 121 or the second base station 122 is a network infrastructure which provides a wireless access to a terminal within a coverage. The first base station 121 or the second base station 122 has a coverage defined as a certain geographic area based on a distance in which a signal can be transmitted. In the disclosure, the coverage may refer to a range in which a signal can be transmitted through beamforming, that is, a beam coverage. The first base station 121 or the second base station 122 may be referred to as, in addition to a base station, an "access point (AP)", an "eNodeB (eNB)", a "5th generation node (5G node)", a "5G NodeB (NB)", a "wireless point", a "transmission/reception point (TRP)", a "distributed unit (DU)", a "radio unit (RU)", a "remote radio head (RRH)" or another term having an equivalent technical meaning.

The first terminal 131 and the second terminal 132 are devices used by a user, and communicate with a base station of a corresponding service provider through a wireless channel. In some cases, at least one of the first terminal 131 and the second terminal 132 may be operated without a user's involvement. For example, the first terminal 131 is a device for performing machine type communication (MTC) and may not be carried by a user. Each of the first terminal 131 and the second terminal 132 may be referred to as, in addition to a terminal, a "user equipment (UE)", a "customer premises equipment (CPE)", a "mobile station", a "subscriber station", a "remote terminal", a "wireless terminal", an "electronic device", a "user device", or another term having an equivalent technical meaning. A terminal (e.g., the first terminal 131 or the second terminal 132) according to various embodiments of the disclosure may include at least one of, for example, a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, and a wearable device.

The first base station 121, the second base station 122, the first terminal 131, and the second terminal 132 may transmit and receive radio signals in millimeter wave (mmWave) bands (e.g., 28 GHz, 30 GHz, 38 GHz, and 60 GHz). In this case, in order to improve a channel gain, the first base station 121, the second base station 122, the first terminal 131, and the second terminal 132 may perform beamforming. The beamforming includes transmission beamforming and reception beamforming. That is, the first base station 121, the second base station 122, the first terminal 131, and the second terminal 132 may give directivity to a transmission signal or a reception signal. The first base station 121 may perform beamforming through a first beam 141, a second beam 142, and a third beam 143, and the second base station 122 may perform beamforming through a fourth beam 144, a fifth beam 145, a sixth beam 146, and a seventh beam 147. Although not shown in FIG. 1, the first terminal 131 or the second terminal 132 may also perform beamforming through a beam.

In a beamforming-based communication system, a service area may be defined according to a direction of a location in which a terminal is located as well as a distance, according to a directional characteristic of a beam. Hereinafter, a situation in which a terminal (e.g., the first terminal 131 or the second terminal 132) subscribed to a service provided by a service provider receives data provided from a service provider's server through a base station (e.g., the first base station 121 or the second base station 122) will be described.

The first terminal 131 may be located in a service area through the second beam 142 and the third beam 143 of the first base station 121, or the fourth beam 144 and the fifth beam 145 of the second base station 122. The first terminal may receive downlink data through at least one of the second beam 142, the third beam 143, the fourth beam 144, and the fifth beam 145. If the first terminal receives downlink data through the second beam 142 of the first base station 121, the third beam 143, the fourth beam 144, and the fifth beam 145 may be a free beam for the first terminal (or may be referred to as an extra beam, an additional beam, a spare beam, a dummy beam, or a remaining beam). When not considering the existence of another terminal, a situation in which the free beam as described above (hereinafter, beam overflow) is generated may be inefficient in view of the entire beamforming network. Accordingly, the operating device 110 according to various embodiments may reconfigure a beamforming operation scheme to efficiently operate the beamforming network.

The second terminal 132 may be located inside a building. The building may be located in a service area through the seventh beam 147 of the second base station 122. A terminal (not shown) located on a relatively low floor in the building, that is, the terminal located at a low-elevation location may receive downlink data through the seventh beam 147. On the other hand, a terminal located on a relatively high floor in the building, that is, the second terminal 132 located at a high-elevation location may not receive downlink data through the seventh beam 147. Therefore, the operating device 110 according to various embodiments may reconfigure the beamforming operation scheme to prevent service outage of a terminal.

In FIG. 1, as a separate deployment, the operating device 110 is illustrated as a separate device from the first base station 121 or the second base station 122. In some embodiments, the operating device 110 may be a separate network entity for configuring a beamforming network according to various embodiments. For example, the operating device 110 may be a network entity of a node higher than the first base station 121 and the second base station 122 or may be a separate device attached to the base station. In some other embodiments, the operating device 110 may be a CU configured to perform a function of an upper layer (e.g., packet data convergence protocol (PDCP), RRC) in a radio access network (RAN), and the first base station 121 or the second base station 122 may be a DU (or TRP) configured to perform a function of a lower layer (e.g., medium access control (MAC), and physical (PHY)). In some other embodiments, unlike FIG. 1, the operating device 110 may be included in the first base station 121 or the second base station 122 as an integrated deployment. The operating device 110 is located in a specific base station (e.g., the first base station 121) and may perform signaling for transmitting and receiving information (e.g., coverage information, beam information, and reception strength information) with another base station (e.g., the second base station 122) to perform operations for configuring a beamforming network according to various embodiments.

In the following disclosure, for convenience of description, the operating device 110 is described as a device independent of the first base station 121 and the second base station 122, but is not limited thereto.

Figure 2:
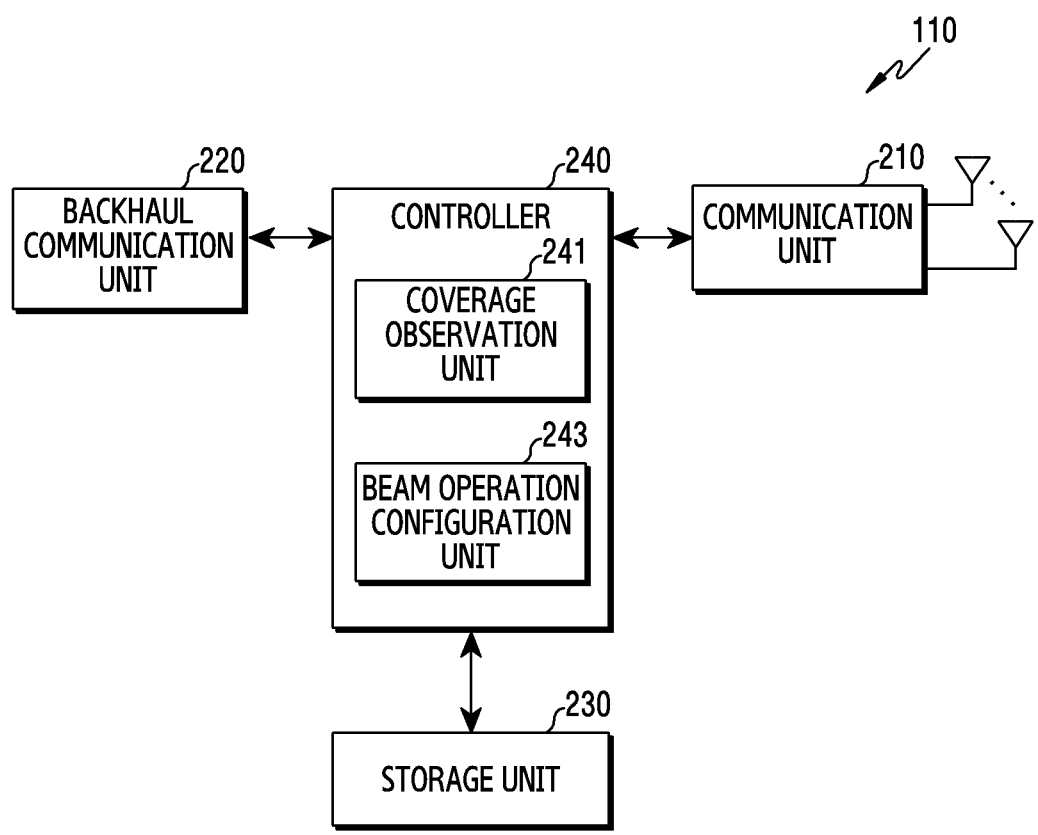
FIG. 2 illustrates a configuration of a beamforming network operating device in a wireless communication system according to various embodiments of the disclosure.

FIG. 2 illustrates a configuration of a beamforming network operating device in a wireless communication system according to various embodiments of the disclosure. The configuration illustrated in FIG. 2 may be understood as the configuration of the beamforming network operating device 110. The term "~unit", ~er/or", or the like used hereinafter may refer to a unit for processing at least one function or operation, and may be implemented in hardware, software, or a combination of hardware and software.

Referring to FIG. 2, a beamforming network operating device (hereinafter, referred to as an operating device) includes a communication unit 210, a backhaul communication unit 220, a storage unit 230, and a controller 240.

The communication unit 210 may perform functions for transmitting and receiving information. Specifically, the communication unit 210 may provide an interface for performing communication with other nodes in a network. That is, the communication unit 210 converts a bit stream transmitted from the operating device to another node, for example, a server, a sensor device, an upper network node, etc. into a physical signal, and converts a physical signal received from the base station into a bit stream.

The communication unit 210 may perform functions for transmitting and receiving a signal in a wired communication environment. The communication unit 210 may include a wired interface for controlling a direct connection between a device and a device through a transmission medium (e.g., a copper wire or an optical fiber). For example, the communication unit 210 may transfer an electrical signal to another device through a copper wire, or may convert between an electrical signal and an optical signal.

The communication unit 210 may perform functions for transmitting and receiving a signal in a wireless communication environment. For example, the communication unit 210 may perform a function of conversion between a baseband signal and a bit stream according to a physical layer standard of the system. In addition, the communication unit 210 may include a plurality of transmission and reception paths.

The communication unit 210 transmits and receives a signal as described above. Accordingly, the communication unit 210 may be referred to as a "transmitter", a "receiver", or a "transceiver". In addition, in the following description, transmission and reception are used as a meaning including the above-described processing performed by the communication unit 210.

According to various embodiments, the communication unit 210 may receive coverage information from each base station. The coverage information may include parameters considered for each base station to determine a serviceable area through beamforming, information indicating an area requiring control (e.g., a change in a beamforming operation configuration), or information indicating parameters requiring additional control. According to various embodiments, the communication unit 210 may provide, to each base station, beamforming parameters or hardware information (e.g., lens information) necessary for changing the beamforming operation configuration.

The backhaul communication unit 220 provides an interface for performing communication with other nodes in the network (e.g., the first base station 121 and the second base station 122 of FIG. 1). That is, the backhaul communication unit 220 converts a bit stream transmitted from the operating device to another node, for example, another access node, a base station, an upper node, a core network, etc. into a physical signal, and converts a physical signal received from another node into a bit stream.

The storage unit 230 stores data such as a basic program, an application program, and configuration information for the operation of the operating device. The storage unit 230 may be configured by a volatile memory, a nonvolatile memory, or a combination of the volatile memory and the nonvolatile memory. Further, the storage unit 230 provides stored data at the request of the controller 240.

The controller 240 controls overall operations of the operating device. For example, the controller 240 transmits and receives a signal through the communication unit 210 or the backhaul communication unit 220. In addition, the controller 240 records and reads data in the storage unit 230. To this end, the controller 240 may include at least one processor. According to various embodiments, the controller 240 may include a coverage observation unit 241 for monitoring a coverage of each of base stations controllable by the operating device and a beam operation configuration unit 243 for reconfiguring a beamforming network according to an environmental change. The coverage observation unit 241 or the beam operation configuration unit 243 may be, as a command set or a code stored in the storage unit 230, an instruction/code at least temporarily residing in the controller 240, a storage space storing the instruction/code, or a part of a circuitry configuring the controller 240. According to various embodiments, the controller 240 may control the operating device to perform operations according to various embodiments described below.

FIG. 2 illustrates that the beamforming network operating device includes the communication unit 210 and the backhaul communication unit 220, but according to some embodiments, one of the communication unit 210 and the backhaul communication unit 220 may be omitted.

Figure 3:
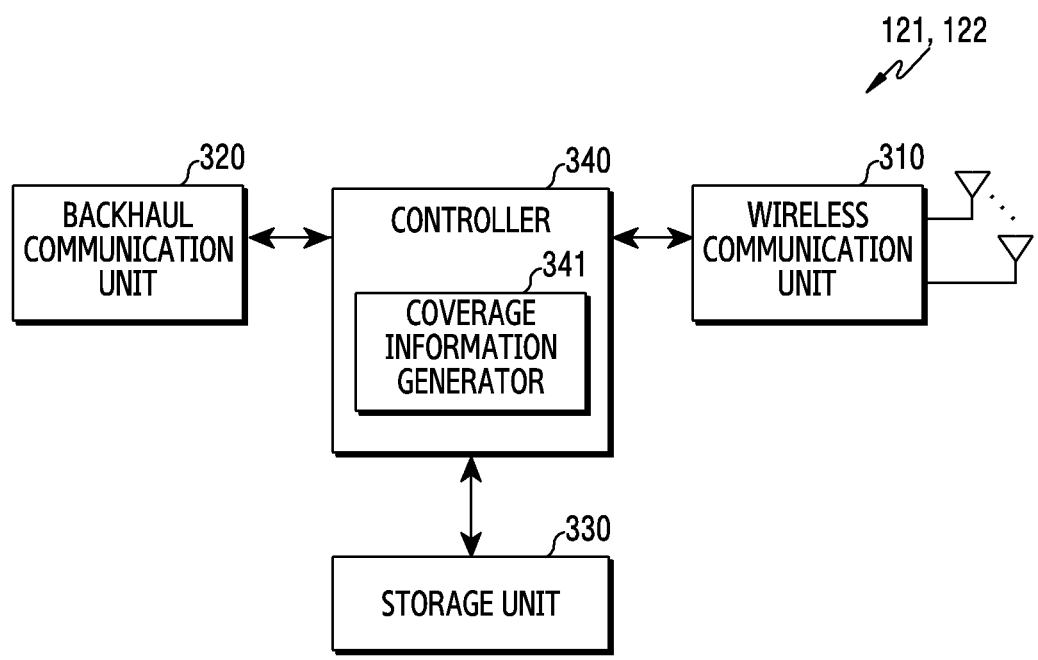
FIG. 3 illustrates a configuration of a base station in a wireless communication system according to various embodiments of the disclosure.

FIG. 3 illustrates a configuration of a base station in a wireless communication system according to various embodiments of the disclosure. The configuration illustrated in FIG. 3 may be understood as the configuration of the first base station 121 or the second base station 122. The term "~unit", ~er/or", or the like used hereinafter may refer to a unit for processing at least one function or operation, and may be implemented in hardware, software, or a combination of hardware and software.

Referring to FIG. 3, a base station includes a wireless communication unit 310, a backhaul communication unit 320, a storage unit 330, and a controller 340.

The wireless communication unit 310 performs functions for transmitting and receiving a signal through a wireless channel. For example, the wireless communication unit 310 performs a function of conversion between a baseband signal and a bit stream according to a physical layer standard of the system. For example, during data transmission, the wireless communication unit 310 generates complex symbols by encoding and modulating a transmission bit stream. In addition, during data reception, the wireless communication unit 310 restores a reception bit stream by demodulating and decoding a baseband signal. In addition, the wireless communication unit 310 up-converts a baseband signal into a radio frequency (RF) band signal and then transmits the RF band signal through an antenna, and down-converts the RF band signal received through the antenna into the baseband signal.

To this end, the wireless communication unit 310 may include a transmission filter, a reception filter, an amplifier, a mixer, an oscillator, a digital to analog convertor (DAC), an analog to digital convertor (ADC), etc. In addition, the wireless communication unit 310 may include a plurality of transmission and reception paths. Further, the wireless communication unit 310 may include at least one antenna array configured by a plurality of antenna elements. In terms of hardware, the wireless communication unit 310 may be configured by a digital unit and an analog unit, and the analog unit may be configured by a plurality of sub-units according to operating power, operating frequency, and the like.

The wireless communication unit 310 transmits and receives a signal as described above. Accordingly, an entirety or a part of the wireless communication unit 310 may be referred to as a "transmitter", a "receiver", or a "transceiver". In addition, in the following description, transmission and reception performed through a wireless channel are used as a meaning including the above-described processing performed by the wireless communication unit 310.

The backhaul communication unit 320 provides an interface for performing communication with other nodes in a network (e.g., the beamforming network operating device 110 of FIG. 1). That is, the backhaul communication unit 320 converts a bit stream transmitted from the base station to another node, for example, another access node, another base station, an upper node, a core network, etc. into a physical signal, and converts a physical signal received from another node into a bit stream.

The storage unit 330 stores data such as a basic program, an application program, and configuration information for the operation of the base station. The storage unit 330 may be configured by a volatile memory, a nonvolatile memory, or a combination of the volatile memory and the nonvolatile memory. Further, the storage unit 330 provides stored data at the request of the controller 340.

The controller 340 controls overall operations of the base station. For example, the controller 340 transmits and receives a signal through the wireless communication unit 310 or the backhaul communication unit 320. In addition, the controller 340 records and reads data in the storage unit 330. Further, the controller 340 may perform functions of a protocol stack required by a communication standard. To this end, the controller 340 may include at least one processor. According to various embodiments, the controller 340 may include a coverage information generator 341. The coverage information generator 341 may generate coverage information indicating an area (e.g., a beamforming service area) serviceable by the base station. The controller 340 may control the wireless communication unit 310 to transmit the generated coverage information. The coverage information generator 341 may be, as a command set or a code stored in the storage unit 330, an instruction/code at least temporarily resided in the controller 340, a storage space storing the instruction/code, or a part of a circuitry configuring the controller 340. According to various embodiments, the controller 340 may control the base station to perform operations according to various embodiments described below.

Figure 4:
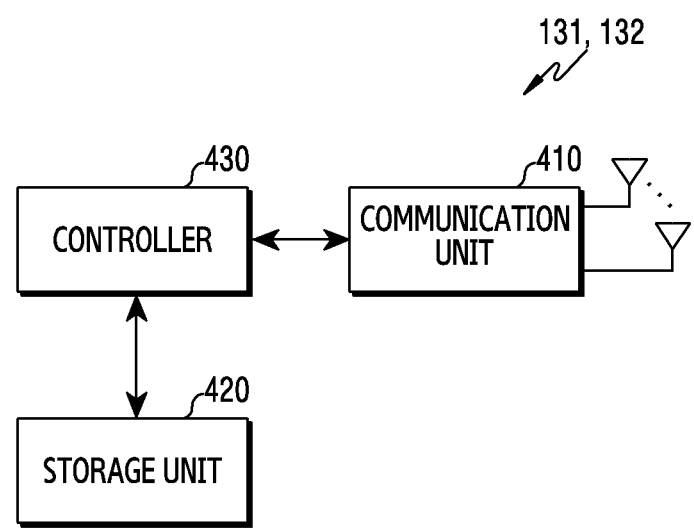
FIG. 4 illustrates a configuration of a terminal in a wireless communication system according to various embodiments of the disclosure.

FIG. 4 illustrates a configuration of a user equipment in a wireless communication system according to various embodiments of the disclosure. The configuration illustrated in FIG. 4 may be understood as the configuration of the first terminal 131 or the second terminal 132. The term "~unit", ~er/or", or the like used hereinafter may refer to a unit for processing at least one function or operation, and may be implemented in hardware, software, or a combination of hardware and software.

Referring to FIG. 4, a terminal includes a communication unit 410, a storage unit 420, and a controller 430.

The communication unit 410 performs functions for transmitting and receiving a signal through a wireless channel. For example, the communication unit 410 performs a function of conversion between a baseband signal and a bit stream according to a physical layer standard of the system. For example, during data transmission, the communication unit 410 generates complex symbols by encoding and modulating a transmission bit stream. In addition, during data reception, the communication unit 410 restores a reception bit stream by demodulating and decoding a baseband signal. In addition, the communication unit 410 up-converts a baseband signal into a RF band signal and then transmits the RF band signal through an antenna, and down-converts the RF band signal received through the antenna into the baseband signal. For example, the communication unit 410 may include a transmission filter, a reception filter, an amplifier, a mixer, an oscillator, a DAC, an ADC, etc.

In addition, the communication unit 410 may include a plurality of transmission and reception paths. Further, the communication unit 410 may include at least one antenna array configured by a plurality of antenna elements. In terms of hardware, the communication unit 410 may be configured by a digital circuit and an analog circuit (e.g., a radio frequency integrated circuit (RFIC)). The digital circuit and the analog circuit may be implemented in one package. In addition, the communication unit 410 may include a plurality of RF chains. Further, the communication unit 410 may perform beamforming.

In addition, the communication unit 410 may include different communication modules to process signals of different frequency bands. Furthermore, the communication unit 410 may include a plurality of communication modules to support a plurality of different radio access technologies. For example, different radio access technologies may include Bluetooth low energy (BLE), wireless fidelity (Wi-Fi), Wi-Fi gigabyte (WiGig), a cellular network (e.g., long term evolution (LTE)), and the like. In addition, different frequency bands may include a super high frequency (SHF) (e.g., 2.5 GHz or 5 GHz) band, and a millimeter (mm) wave (e.g., 38 GHz, 60 GHz, etc.) band. According to various embodiments, a communication module may include at least one sensor. A sensor mounted in the communication module may provide measurement information (or sensor information) of an operation for directivity control to a processor (e.g., a communication processor (CP)) in the communication module.

The communication unit 410 transmits and receives a signal as described above. Accordingly, an entirety or a part of the communication unit 410 may be referred to as a "transmitter", a "receiver", or a "transceiver". In addition, in the following description, transmission and reception performed through a wireless channel are used as a meaning including the above-described processing performed by the communication unit 410.

The storage unit 420 stores data such as a basic program, an application program, and configuration information for the operation of the terminal. The storage unit 420 may be configured by a volatile memory, a nonvolatile memory, or a combination of the volatile memory and the nonvolatile memory. Further, the storage unit 420 provides stored data at the request of the controller 430.

The controller 430 controls overall operations of the terminal. For example, the controller 430 transmits and receives a signal through the communication unit 410. In addition, the controller 430 records and reads data in the storage unit 420. Further, the controller 430 may perform functions of a protocol stack required by a communication standard. To this end, the controller 430 may include at least one processor or a micro-processor, or may be a part of a processor. In addition, a part of the communication unit 410 and the controller 430 may be referred to as a CP. The controller 430 may include various modules for performing communication. According to various embodiments, the controller 430 may control to transmit a preamble to access a base station. The preamble may be transmitted in an omni-directional or directional communication scheme. According to various embodiments, the controller 430 may control the terminal to perform operations according to various embodiments described below.

Figure 5A:
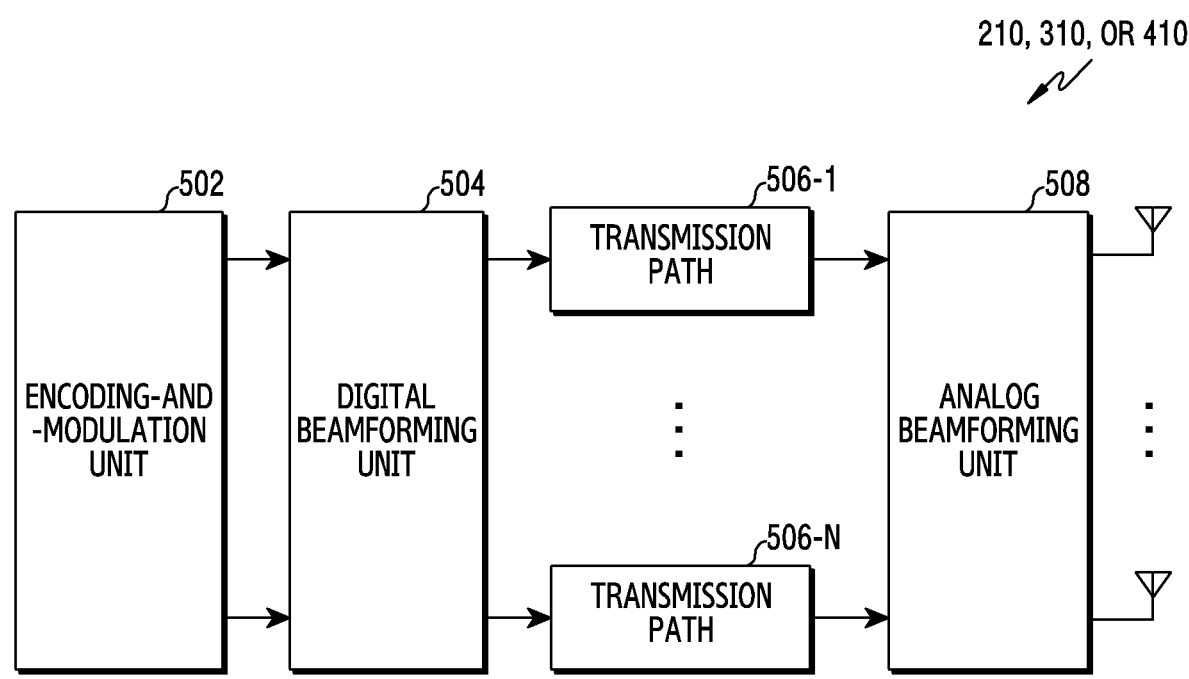
FIGS. 5A to 5C illustrate a configuration of a communication unit in a wireless communication system according to various embodiments of the disclosure.
Figure 5B:
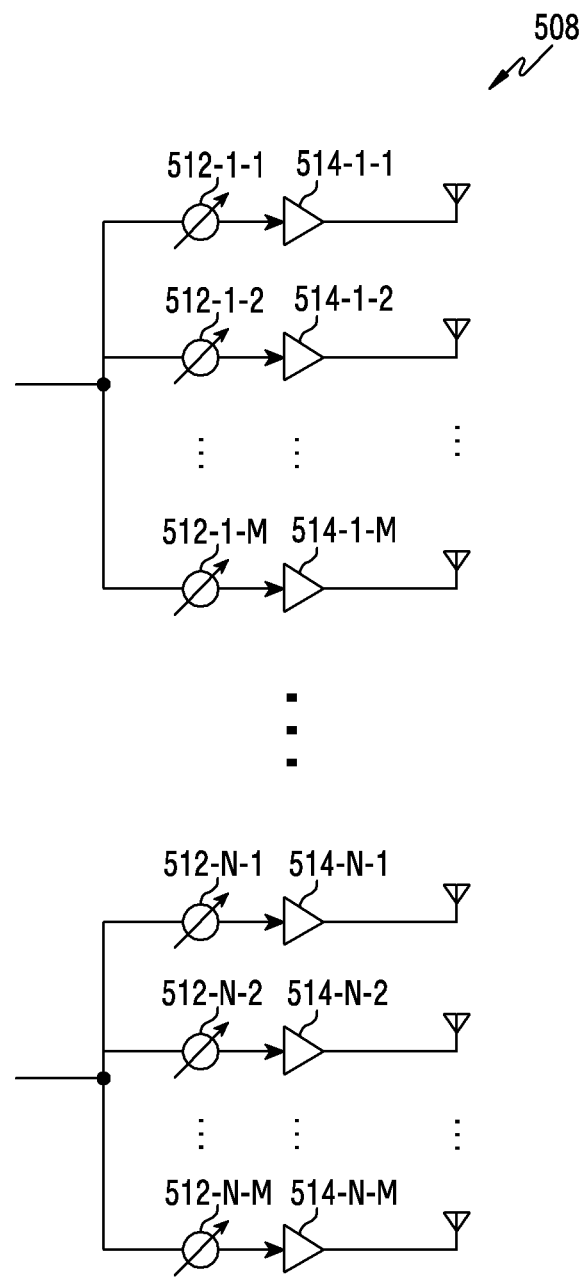
Figure 5C:
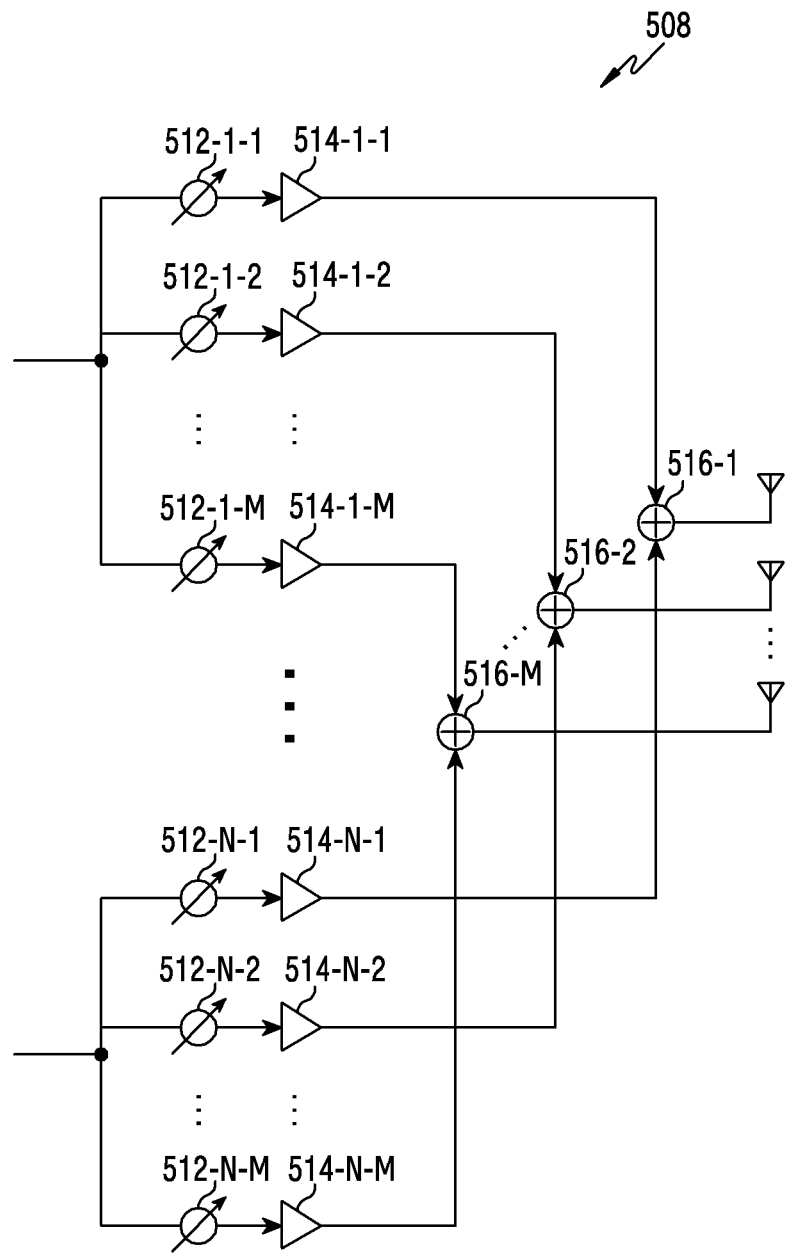

FIGS. 5A to 5C illustrate a configuration of a communication unit in a wireless communication system according to various embodiments of the disclosure. FIGS. 5A to 5C illustrate an example of a detailed configuration of the wireless communication unit 310 of FIG. 3 or the communication unit 410 of FIG. 4. Specifically, FIGS. 5A to 5C illustrate elements for performing beamforming, as a part of the wireless communication unit 310 of FIG. 3 or the communication unit 410 of FIG. 4. According to some embodiments, FIGS. 5A to 5C may illustrate elements of the communication unit 210 of FIG. 2.

Referring to FIG. 5A, the communication unit 210, the wireless communication unit 310, or the communication unit 410 includes an encoding-and-modulation unit 502, a digital beamforming unit 504, a plurality of transmission paths 506-1 to 506-N, and an analog beamforming unit 508.

The encoding-and-modulation unit 502 performs channel encoding. For channel encoding, at least one of a low density parity check (LDPC) code, a convolution code, and a polar code may be used. The encoding-and-modulation unit 502 generates modulation symbols by performing constellation mapping.

The digital beamforming unit 504 performs beamforming on a digital signal (e.g., modulation symbols). To this end, the digital beamforming unit 404 multiplies the modulation symbols by beamforming weights. The beamforming weights may be used to change a magnitude and a phase of a signal, and may be referred to as a "precoding matrix", a "precoder", or the like. The digital beamforming unit 404 outputs the digital-beamformed modulation symbols to the plurality of transmission paths 506-1 to 506-N. In this case, according to a multiple input multiple output (MIMO) transmission technique, the modulation symbols may be multiplexed, or the same modulation symbols may be provided to the plurality of transmission paths 506-1 to 506-N.

The plurality of transmission paths 506-1 to 506-N convert the digital-beamformed digital signals into analog signals. To this end, each of the plurality of transmission paths 506-1 to 506-N may include an inverse fast Fourier transform (IFFT) calculation unit, a cyclic prefix (CP) insertion unit, a DAC, and an up-conversion unit. The CP insertion unit may be for an orthogonal frequency division multiplexing (OFDM) scheme and may be excluded when another physical layer scheme (e.g., a filter bank multi-carrier (FBMC)) is applied. That is, the plurality of transmission paths 506-1 to 506-N provide an independent signal processing process for a plurality of streams generated through digital beamforming. However, according to an implementation manner, a part of the elements of the plurality of transmission paths 506-1 to 506-N may be shared.

The analog beamforming unit 508 performs beamforming on an analog signal. To this end, the digital beamforming unit 504 multiplies analog signals by beamforming weights. The beamforming weights are used to change a magnitude and a phase of a signal. Particularly, the analog beamforming unit 508 may be configured as shown in FIG. 5B or 5C according to a connection structure between the plurality of transmission paths 506-1 to 506-N and antennas.

Referring to FIG. 5B, signals input to the analog beamforming unit 508 are transmitted via antennas through a phase/magnitude conversion and an amplification operation. In this case, a signal of each path is transmitted through different antenna sets, that is, antenna arrays. In consideration of the processing of a signal input through a first path, the signal is converted into a signal sequence having different phases/magnitudes or the same phase/magnitude by phase/magnitude conversion units 512-1-1 to 512-1-M, amplified by amplifiers 514-1-1 to 514-1-M, and then transmitted through the antennas.

Referring to FIG. 5C, signals input to the analog beamforming unit 508 are transmitted via antennas through a phase/magnitude conversion and an amplification operation. In this case, a signal of each path is transmitted through the same antenna set, that is, an antenna array. In consideration of the processing of the signal input through the first path, the signal is converted into a signal sequence having different phases/magnitudes or the same phase/magnitude by the phase/magnitude conversion units 512-1-1 to 512-1-M, and amplified by the amplifiers 514-1-1 to 514-1-M. Further, the amplified signals are summed by summation units 516-1-1 to 516-1-M with reference to an antenna element so as to allow the amplified signals to be transmitted through one antenna array, and then are transmitted through the antennas.

FIG. 5B illustrates an example in which an independent antenna array for each transmission path is used, and FIG. 5C illustrates an example in which transmission paths share one antenna array. However, according to another embodiment, a part of the transmission paths may use an independent antenna array, and the other transmission paths may share one antenna array. Furthermore, according to another embodiment, a switchable structure is applied between the transmission paths and antenna arrays, so that a structure which can be adaptively changed according to a situation may be used.

Hereinafter, through FIGS. 6 to 10, specific operations for self-organizing beamforming according to various embodiments are described. The self-organizing beamforming in the disclosure includes coverage monitoring for determining a coverage of a beamforming network and reconfiguration (or redesign) of a beamforming operation scheme according to a change in a state of the network.

Self-Organizing Beamforming (SOB)

Figure 6:
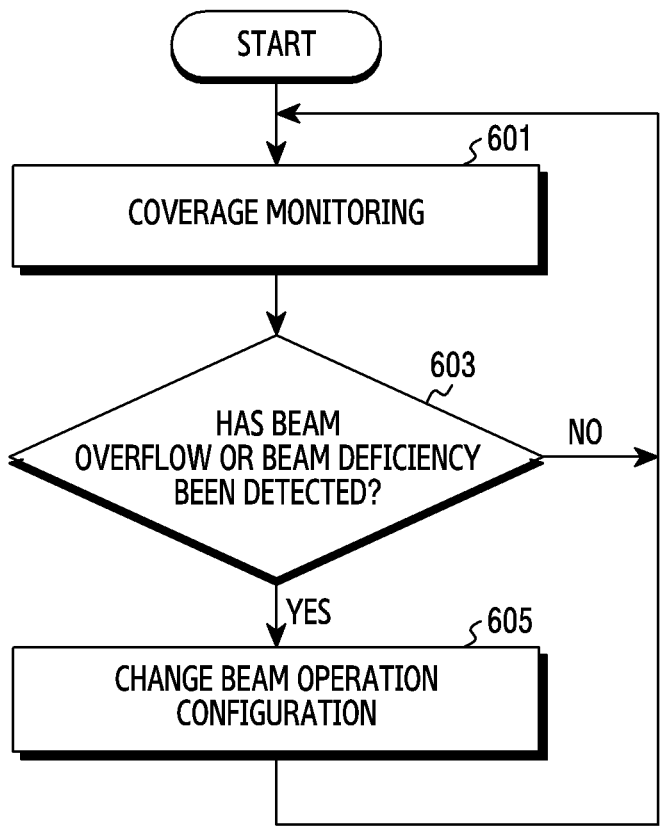
FIG. 6 is a flowchart of a beamforming network operating device for self-organizing beamforming in a wireless communication system according to various embodiments of the disclosure.

FIG. 6 is a flowchart of a beamforming network operating device for self-organizing beamforming in a wireless communication system according to various embodiments of the disclosure. Hereinafter, the beamforming network operating device (hereinafter, referred to as an operating device) exemplifies the beamforming network operating device 110 of FIG. 1.

Referring to FIG. 6, in operation 601, the operating device may perform coverage monitoring. The operating device may monitor a beam coverage of a beamforming network. The beamforming network refers to a wireless communication network including the operating device, base stations controllable by the operating device, and terminals of each base station. That is, the operating device may monitor a beam coverage of a base station.

The operating device may determine a beam coverage. The beam coverage may include an area serviceable through beamforming in each base station. The operating device may determine a beam coverage of each base station, based on at least one of information on deployment of each base station, information on beams operated in each base station, or information received from each base station. In some embodiments, the operating device may determine the total coverage of the beamforming network by the operating device through the beam coverage of each base station. In some other embodiments, the operating device may determine the beam coverage required for determining whether to change a beamforming operation configuration on the beamforming network.

The operating device may determine an issue area. The issue area may be an area in which it is necessary to determine whether to change the beamforming operation configuration, such as an area in which there is a large number of free beams or a new base station is added. The operating device may determine a beam coverage of each of base stations adjacent to the issue area to determine whether to change the beamforming operation configuration. Hereinafter, specific examples for determining the issue area are described.

Input Information

The operating device may determine an issue area according to input information. The input information may be information received from another device (e.g., a server or a sensor) or obtained by a user's manual input. The operating device may be configured according to the received input information. For example, the operating device may receive input information indicating changes in an environment and a terrain feature, such as the existence (new construction) or nonexistence (e.g. demolition) of a new building within the beamforming network, a change in the height of a building (e.g., signboard installation or extension), and a location of a tree. The operating device may determine, as the issue area, a location of a building in which a state change thereof has occurred, like a case where new information is input compared to previous information.

For another example, the operating device may receive input information relating to a new terminal. The new terminal may refer to a terminal newly subscribed to a service of a service provider (an operator) of the operating device. The input information relating to the new terminal may be an identifier (ID) for the newly subscribed terminal or location information for the terminal. The operating device may determine a location of the new terminal as the issue area. If the terminal is a CPE, a location of the terminal may be determined according to an address configured by a user who subscribes to the service. If the terminal is a mobile terminal, a location of the terminal may be determined based on statistical information obtained through UE mobility information.

For another example, the operating device may receive input information indicating a location of a base station, addition of a new base station or removal of an existing base station, or a change in hardware of a base station (e.g., a change of an antenna type). The operating device may determine, as the issue area, a location of a base station in which a state change thereof (addition, removal, or change) has occurred.

For another example, the operating device may receive input information relating to the amount of traffic. Particularly, the operating device may receive input information indicating a location in which there is a lot of traffic, that is, a region in which traffic greater than or equal to a threshold value occurs, or a region in which traffic is expected to be high. The region may be based on units of cells or sectors. According to an embodiment, the threshold value may be adaptively configured based on at least one of a time, a region, and the number of neighboring base stations. The operating device may determine, as the issue area, a region in which the amount of traffic rapidly increases or decreases compared to a standard.

For another example, the operating device may receive input information indicating a change in a propagation environment according to a weather condition, and a corresponding region. The weather may change rapidly, which may cause unstable wireless channel conditions, or a weather condition may worsen, which may cause a high degree of noise or interference, and a weak receiving sensitivity of a signal. That is, a coverage may be changed according to weather conditions. The operating device may determine, as the issue area, a region in which a coverage is expected to be changed according to the input information.

Coverage Information

The operating device may determine an issue area according to coverage information. The operating device may receive coverage information from a base station. The coverage information may be information for determining a coverage formed through a beam operation configuration. The coverage information may be information for designing an area which can be serviced by each base station through beamforming, that is, a beam coverage. The service availability may include not only whether data can be transmitted/received but also whether a predetermined transmission rate or quality (e.g., quality of service (QoS)) is satisfied.

The operating device may receive coverage information including a measurement result of a terminal. The measurement result includes a channel quality measured by the terminal through a signal (e.g., a reference signal and a synchronization signal) transmitted from the base station to the terminal. For example, the reference signal may be one of a beam reference signal (BRS), a beam refinement reference signal (BRRS), a cell-specific reference signal (CRS), a channel state information-reference signal (CSI-RS), a demodulation-RS (DM-RS), and a measurement reference signal (MRS). The terminal may measure a channel quality of a received signal. For example, the channel quality may be at least one of a reference signal received quality (RSRQ), a received signal strength indicator (RSRI), a signal to interference and noise ratio (SINR), a carrier to interference and noise ratio (CINR), a signal to noise ratio (SNR), an error vector magnitude (EVM), a bit error rate (BER), and a block error rate (BLER), in addition to a beam reference signal received power (BRSRP) and a reference signal received power (RSRP).

The terminal may determine channel quality values by measuring a channel quality for each of signals transmitted using different beams from each base station. The terminal may generate a measurement report (MR) message including a measurement result. For example, the terminal may generate a measurement report message including all of the channel quality values. For another example, the terminal may generate a measurement report message including a beam of a signal having the best channel quality (e.g., the largest RSRP) or a channel quality value of the beam. For another example, the terminal may generate a measurement report message including beams corresponding to the top N number of channel quality values (N is an integer of 2 or more) or a channel quality value of each of the beams. For another example, the terminal may generate a measurement report message including beams having a channel quality of a predetermined level or more or a channel quality value of each of the beams. The ranking of measured channel qualities may be determined according to a sequence in which a measured parameter having a larger value precedes a parameter having a smaller value, when the measured parameters are channel qualities related to a signal magnitude, or a sequence in which a measured parameter having a smaller value precedes a parameter having a larger value, when the measured parameters are channel qualities related to an error rate.

The terminal may transmit a measurement report message to the base station. The base station may generate coverage information from the measurement report message. In some embodiments, the base station may generate coverage information including all of measurement results in the measurement report message. That is, each base station may generate coverage information including a measurement result for a corresponding cell. In some other embodiments, the base station may determine an item (e.g., free beam) specifiable in units of cells from a measurement result and generate coverage information including the determined item. The base station may transmit the coverage information to the operating device.

The operating device may receive the coverage information from the base station. The operating device may determine the issue area from the coverage information. According to various embodiments, the operating device may detect the occurrence of a change of a channel from the coverage information. The operating device may determine, as the issue area, a region in which a channel change occurs. For example, the operating device may detect that an RSRP for a beam of the base station decreases as a building is constructed. The operating device may determine an area related to the beam of the base station as the issue area. For another example, the operating device may identify a beam which is not used for data transmission among beams forming a coverage (that is, beams used for measurement). The operating device may determine, as the issue area, an area related to the beam which is not used for data transmission. Identifying of the beam which is not used for data transmission may mean, for example, that a terminal has moved, the terminal receives a service provided through a serving beam by another base station, or the terminal is located outside of the coverage.

According to various embodiments, the operating device may determine the total coverage of the beamforming network according to the current beam operation configuration from the coverage information. The operating device may determine the issue area after determining the total coverage. For example, the operating device is required to extend the total coverage to an area outside thereof to extend the mobility of the existing terminal. A new terminal may be located in the area outside of the total coverage formed according to the current beamforming operation configuration. The operating device may determine a boundary part of the total coverage area as the issue area. For another example, the operating device may detect a new terminal (e.g., a terminal of a user who subscribes to a new service). The operating device may determine whether an identifier of the new terminal is included in a measurement report message received by each base station from the coverage information. The operating device may determine whether a service can be provided to the new terminal according to whether the identifier of the new terminal is included in the measurement report message. The operating device may determine whether the service can be provided to the new terminal through the current beamforming operation configuration (that is, the total coverage of the current beamforming network). The operating device may determine the total coverage as the issue area.

The operating device may receive coverage information including characteristic information of a base station. The characteristic information of the base station may include configurations of the base station for determining a coverage or controllable hardware information. In some embodiments, the characteristic information may include a beam control configuration of the base station. For example, the beam control configuration may include configuration information (e.g., the number, a width, and a direction) for beams operated by the base station, a beam scan range, hardware configuration in operation for beamforming (e.g., the number of RF chains, the number of antennas, existence and nonexistence of a lens, and a lens in use), antenna characteristics (e.g., a type, the number, and a gain), or power information. In some other embodiments, the characteristic information may include a cell type. The cell type refers to the type of cell formed by the base station. For example, the cell type may include whether the base station is a femto base station (or a small base station) or a macro base station, whether the base station is operated as a base station supporting a primary cell (PCell) when carrier aggregation (CA) is performed, and whether the base station is operated as a base station (a master base station) providing a master cell group (MCG) when dual connectivity (DC) is performed. The operating device may determine the issue area according to a change in the hardware configuration or the configuration of the base station through the characteristic information.

Load Information

The operating device may determine an issue area according to load information. The operating device may receive load information indicating the amount of traffic of a base station. The operating device may determine the issue area, based on the amount of traffic. For example, the operating device may determine, as the issue area, a location in which there is a lot of traffic, that is, a region in which traffic of a predetermined value or more rapidly changes. The amount of traffic may be determined based on geographic information of a beam operated for a data channel by the base station. For example, the operating device may determine an issue area requiring traffic control within a cell of each base station, based on a resource allocation amount of a scheduler of each base station. When a load is concentrated on a resource related to a specific beam, the operating device may determine an area related to the specific beam as the issue area.

Embodiments of determining an issue area through the input information, the coverage information, or the load information have been described above, but the scope of a right of the disclosure is not limited to these descriptions. In addition to the above examples, other information may be additionally used to determine the issue area. In addition, when the issue area is not separately specified according to embodiments, the operating device may determine the total coverage of the beamforming network as the issue area. In addition, in the above-described embodiments, it is illustrated that the operating device determines the issue area from the coverage information and the load information, but each base station may determine the issue area in a corresponding cell and provide the issue area determined through the coverage information to the operating device.

In operation 603, the operating device may determine whether an excess or a lack of beams (hereinafter, referred to as beam overflow/beam deficiency) occurs in the issue area, or whether a network state in the issue area is a beam reasonable state.

The beam overflow refers to a state in which the number of beams for providing a service to a terminal exceeds a threshold value. In other words, the occurrence of beam overflow in the terminal means that the number of beams which can be provided to the terminal exceeds the threshold value. In some embodiments, the beams which can be provided to the terminal may refer to beams which can be overlappingly allocated to service the terminal, regardless of the identity of the base station. In some other embodiments, the number of beams which can be provided to the terminal may refer to the number of beams provided by a different base station. For example, like the case of the first terminal 131 of FIG. 1, when the number of beams which can be serviced by different base stations is 2 and the threshold value is 1, the beam overflow may occur at a location of the first terminal 131 of FIG. 1. According to various embodiments, the threshold value may be determined based on at least one of a characteristic of a service, whether cooperative beamforming is performed, the number of neighboring terminals, the number of neighboring base stations, or a user configuration.

The beam deficiency means a state in which there is no beam for providing a service to a terminal or the number of beams required for providing the service to the terminal is less than a threshold value. For example, like the case of the second terminal 132 of FIG. 1, when there is no serviceable beam, the beam deficiency may occur at a location (or elevation) of the second terminal 132 of FIG. 1.

The beam reasonable state may refer to a state in which beam overflow and beam deficiency do not occur. According to various embodiments, when the number of serviceable beams per terminal is within a predetermined range, a network state of the issue area including a terminal may be the beam reasonable state. The predetermined range may be determined based on at least one of a characteristic of a service, whether cooperative beamforming is performed, the number of neighboring terminals, the number of neighboring base stations, or a user configuration.

Whether beam overflow or beam deficiency occurs in the issue area or whether the network state of the issue area is the beam reasonable state may be determined in units of cells or in units of beamforming networks specified by one operating device. According to various embodiments, when determined in units of cells, each base station may transmit, to the operating device, indication information indicating a beam (e.g., a free beam or a beam adjacent to a beam deficiency area) related to an area in which the beam overflow or beam deficiency occurs in the base station.

According to various embodiments, the operating device may determine whether beam overflow/beam deficiency occurs in the issue area, based on the coverage information. For example, when a plurality of beams having a channel quality (e.g., RSRP) greater than or equal to a threshold value exist with respect to the same terminal, the operating device may determine that the beam overflow occurs. The specific operation of the operating device is described with reference to FIG. 7A described later. For another example, the operating device may determine that the beam deficiency occurs when a measurement result for a beam related to the issue area is not received or when measurement results for each of beams related to the issue area are all less than or equal to the threshold value. The specific operation of the operating device is described with reference to FIG. 7A or 7B described later.

In addition, the operating device may determine whether beam overflow/beam deficiency occurs in the issue area, based on the load information. The operating device may determine whether the beam overflow/beam deficiency occurs in the issue area, based on the load information, the number of terminals receiving a service provided by each base station, the number of beams operated by each base station, and whether a coverage is shared between neighboring base stations.

When beam overflow or beam deficiency occurs in the issue area, the operating device may perform operation 605. This is because the operating device is required to change a beamforming operation configuration to extend a coverage, or increase beam efficiency in the coverage, in order to resolve the beam overflow or beam deficiency. When the beam overflow and the beam deficiency do not occur in the issue area, the operating device may perform operation 601 again. That is, the operating device can maintain the current beamforming operation configuration.

In operation 605, the operating device may change the beamforming operation configuration. The beamforming operation configuration refers to a configuration (or setting) of a beamforming operation scheme. The operating device may reconfigure the beamforming operation scheme.

In some embodiments, the operating device may change the number of beams operated by a base station, the respective beam widths, and a direction of a beam. For example, the operating device may control the base station so as not to operate a free beam when beam overflow occurs. For another example, the operating device may control the base station to widen a beam width when beam deficiency occurs. For another example, when the beam deficiency occurs, the operating device may control the base station to allow an antenna forming a free beam to point in a different direction, that is, to indicate an area in which the beam deficiency has occurred.

In some other embodiments, the operating device may change a beam search range. The operating device may control a base station to change a configuration of beams which perform beam sweeping. For example, when it is determined that there is no terminal in one sector of a base station, that is, when all beams in the corresponding sector are not used for data transmission, the operating device may exclude the beams in the corresponding sector from a beam search range of the base station. A beam search time may be reduced. Hereinafter, the beams which are not used for data transmission may be referred to as unused beams.

In some other embodiments, the operating device may change a configuration of an RF chain for forming a beam in a base station. For example, the operating device may activate inactive RF chains in the base station to cover the issue area in which beam deficiency has occurred. A beam having stronger straightness may be formed through the activated RF chains. A beamforming coverage according to an increase in an arrival distance of the corresponding beam may cover the issue area. For another example, the operating device may change at least one of RF chains for forming a beam in the base station. The operating device may control the base station so that when beam overflow occurs, at least one of the RF chains indicating the issue area points in a different direction (e.g., a phase shift).

In some other embodiments, the operating device may change a lens of an antenna used for forming a beam in a base station. The antenna may be an active lens antenna. The operating device may resolve beam overflow or beam deficiency in the issue area by adjusting the lens of the antenna according to a characteristic of a phase mask for each lens. A detailed description of the lens is described with reference to FIG. 10.

The above-described change operations of the beamforming operation configuration are described as being performed by the operating device, but are not limited thereto. According to embodiments, the operating device may report only whether a change is performed, to a base station, and each base station may perform a change operation of the beamforming operation configuration in operation 605.

The operating device may perform operation 601 again after changing the beamforming operation configuration.

The operating device may adaptively configure a beamforming operation scheme according to a situation by repeatedly performing operations 601 to 605 described above. In other words, the operating device may repeatedly perform coverage monitoring to design an optimal beamforming network environment whenever the monitoring is performed. Through the operating device, self-organizing beamforming may be performed. In some embodiments, a period of the coverage monitoring may be configured to be equal to or longer than a period at which a terminal sends a measurement report to a base station.

FIG. 6 describes that one operating device controls a plurality of base stations, but the disclosure is not limited thereto. That is, a separate device which controls a plurality of operating devices through a hierarchical structure may reconfigure a beamforming operation scheme in a wide area in a network environment.

Figure 7A:
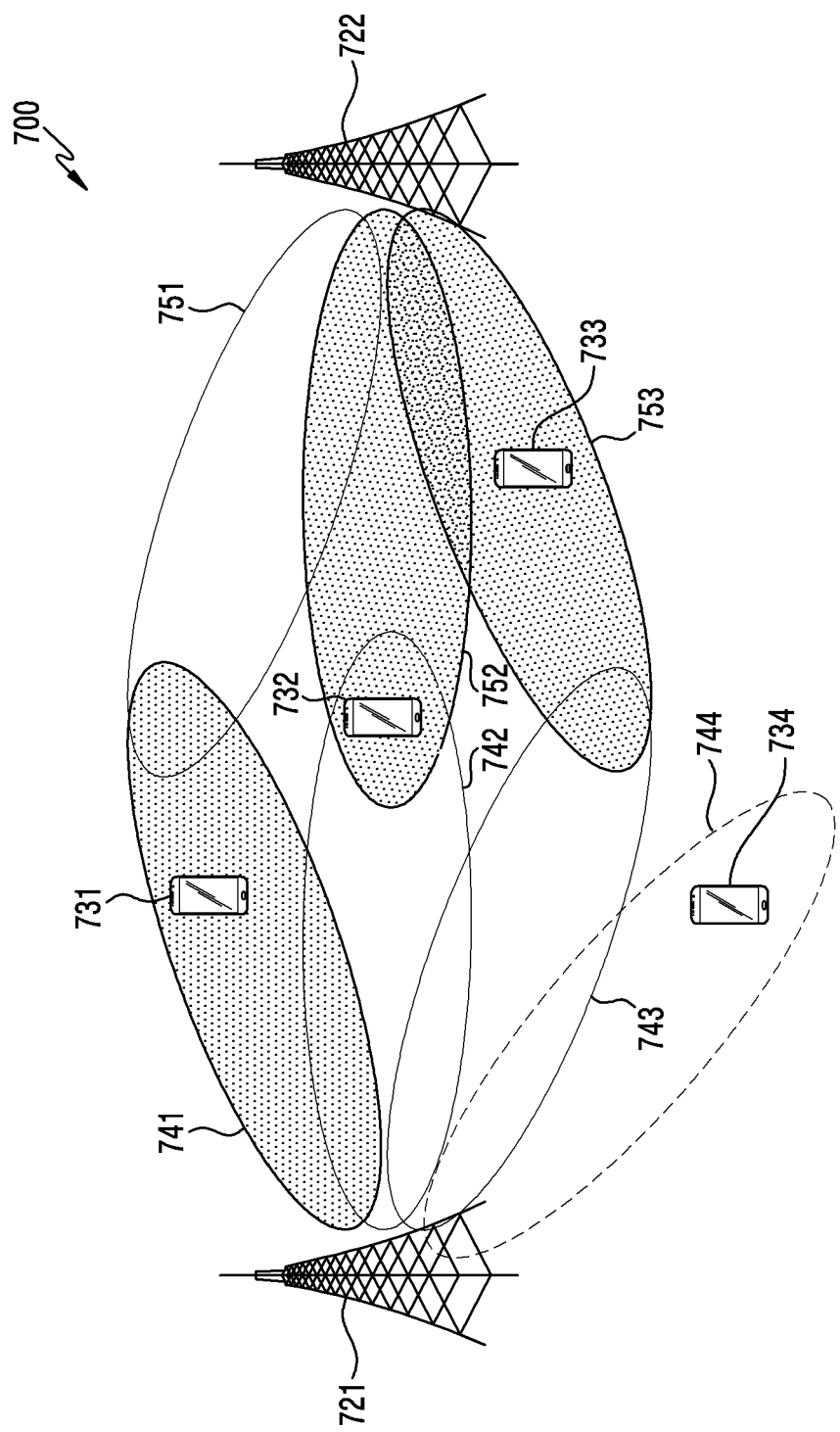
FIG. 7A illustrates an example of self-organizing beamforming in a wireless communication system according to various embodiments of the disclosure.

FIG. 7A illustrates an example of self-organizing beamforming in a wireless communication system according to various embodiments of the disclosure.

Referring to FIG. 7A, a wireless communication environment 700 may include a first base station 721, a second base station 722, a first terminal 731, a second terminal 732, a third terminal 733, a fourth terminal 734, and an operating device (not shown). The first base station 721 may perform communication with at least one terminal in a coverage by using a first beam 741, a second beam 742, and a third beam 743. The second base station 722 may perform communication with at least one terminal in the coverage by using a fourth beam 751, a fifth beam 752, and a sixth beam 753. Hereinafter, it is assumed that a situation in which a serving base station of the first terminal 731 is the first base station 721, a serving base station of the second terminal 732 and the third terminal 733 is the second base station 722, and the fourth terminal 734 is located outside beam coverages of the first base station 721 and the second base station 722.

The serving base station may determine whether beam overflow/beam deficiency occurs, based on a measurement report received from each terminal. The measurement report may include a measurement result for a signal transmitted from a serving base station of a terminal or a measurement result for a signal transmitted from a neighboring base station.

The serving base station may determine a serving beam from the measurement result. For example, the first terminal 731 may measure a channel quality of each of reference signals transmitted from the first base station 721. The reference signals may be signals transmitted using different beams (e.g., the first beam 741, the second beam 742, and the third beam 743). The first terminal 731 may transmit the measurement result to the first base station 721. The measurement result may not include the channel quality measured for a signal transmitted from the second base station 722. This is because the first terminal 731 has a low channel quality outside the beam coverage of the second base station 722. The first base station 721 which is the serving base station may identify, as the first beam 741, a beam corresponding to a reference signal having the best channel quality (e.g., the largest RSRP). The first terminal 731 may perform beamforming communication through the first beam 741 of the first base station 721. That is, the first beam 741 is a serving beam of the first terminal 731. Similarly, the third terminal 733 may perform beamforming communication through the sixth beam 753 of the second base station. The sixth beam 753 is a serving beam of the third terminal 733.

The serving base station may determine the occurrence of beam overflow from the measurement result. The serving base station may determine a free beam from the measurement result. For example, the first base station 721 may determine a free beam, based on a measurement result from each of the first terminal 731, the second terminal 732, and the third terminal 733. The first base station 721 may receive at least one of a measurement result of the first terminal 731 for a reference signal transmitted through the third beam 743, a measurement result of the second terminal 732 for a reference signal transmitted through the third beam 743, or a measurement result of the third terminal 733 for a reference signal transmitted through the third beam 743. The first base station 721 may determine that the third beam 743 is used for the measurement report, but not used for data transmission and reception through beamforming. The first base station 721 may determine the third beam 743 as a free beam (or an unused beam). As such, the serving base station may determine, as a free beam, a beam which does not use a data channel or an object to be measured, based on measurement results from terminals in the serving base station. Meanwhile, although the serving base station has been described as directly determining a free beam, the serving base station may transmit coverage information including the measurement result to the operating device, so that the operating device may determine the free beam.

The operating device may determine whether beam overflow occurs by considering not only one cell but also another cell. For example, the second terminal 732 may measure a channel quality of each of reference signals transmitted from the first base station 721 and the second base station 722. Among beams of the first base station 721, a beam having the highest channel quality measured by the second terminal 732 may be the second beam 742. Among beams of the second base station 722, a beam having the highest channel quality measured by the second terminal 732 may be the fifth beam 752. An RSRP for the second beam 742 may be less than an RSRP for the fifth beam 752. The second terminal 732 may transmit a measurement result to the second base station 722 which is the serving base station. The second base station 722 may identify, as the fifth beam 752, a beam corresponding to the reference signal having the best channel quality (e.g., the largest RSRP). The second terminal 732 may perform beamforming communication through the fifth beam 752. The second base station 722 may transmit coverage information including at least one of information on the second beam 742 or information on the fifth beam 752 to the operating device. For example, the coverage information may include at least one of the RSRP for the second beam 742 or the RSRP for the fifth beam 752. For another example, the coverage information may include at least one of an index indicating the second beam 742 or an index indicating the fifth beam 752.

The operating device may determine that beam overflow has occurred when there are at least two beams of which a channel quality having a predetermined level or higher is guaranteed with respect to one terminal. For example, the operating device may determine that the RSRP for the second beam 742 and the RSRP for the fifth beam 752 are greater than or equal to a threshold value. The operating device may determine the second beam 742 as a temporary free beam from the coverage information. According to embodiments, the operating device may determine beams having an RSRP greater than or equal to the threshold value as temporary free beams. Thereafter, when a measurement report for the second beam 742 is not received or is not used for data transmission and reception even when received, the operating device may finally determine the second beam 742 as a free beam.

The operating device may determine whether beam deficiency occurs by considering not only one cell but also another cell. The operating device may determine, as a beam deficiency area, an area in which beam deficiency has occurred from each base station. For example, the fourth terminal 734 may be a terminal newly subscribed to a service provided by a service provider of the operating device.

According to embodiments, the operating device may obtain location information of the fourth terminal 734 in advance. In this case, an area in which the fourth terminal 734 is located may be an issue area. When the area in which the fourth terminal 734 is located is located outside the total coverage of the beamforming network, the operating device may determine, as the beam deficiency area, the area in which the fourth terminal 734 is located.

According to other embodiments, when the operating device does not separately obtain the location information of the fourth terminal 734, each base station may search for a beam for providing a service to the fourth terminal 734 in order to service the fourth terminal 734 on the beamforming network of the operating device. The first base station 721 may not receive a measurement report from the fourth terminal 734. The first base station 721 may transmit, to the operating device, coverage information indicating that the first base station 721 has not received the measurement report from the fourth terminal 734. The second base station 722 may not receive the measurement report from the fourth terminal 734. The second base station 722 may transmit, to the operating device, the coverage information indicating that the second base station 722 has not received the measurement report from the fourth terminal 734. When all of the base stations fail to receive the measurement report for the fourth terminal 734, the operating device may determine a region outside of a coverage of each base station (e.g., the first base station 721 or the second base station 722) as the beam deficiency area.

The operating device may change the beamforming operation configuration to service the fourth terminal 734. For example, the operating device may add a beam (e.g., a beam 744) which is operated by the first base station 721. For another example, the operating device may control to increase a beam width of a part of the beams of the first base station 721 in order to extend a beam coverage. For another example, the operating device may change a lens of an antenna used for beamforming in the first base station 721, based on the location of the fourth terminal 734. For another example, when the operating device determines that a beam of the fourth terminal 734 is not covered by the beams of the first base station 721 or the second base station 722, the operating device may notify a user of a server or the operating device that additional installation of the base station is required.

Figure 7B:
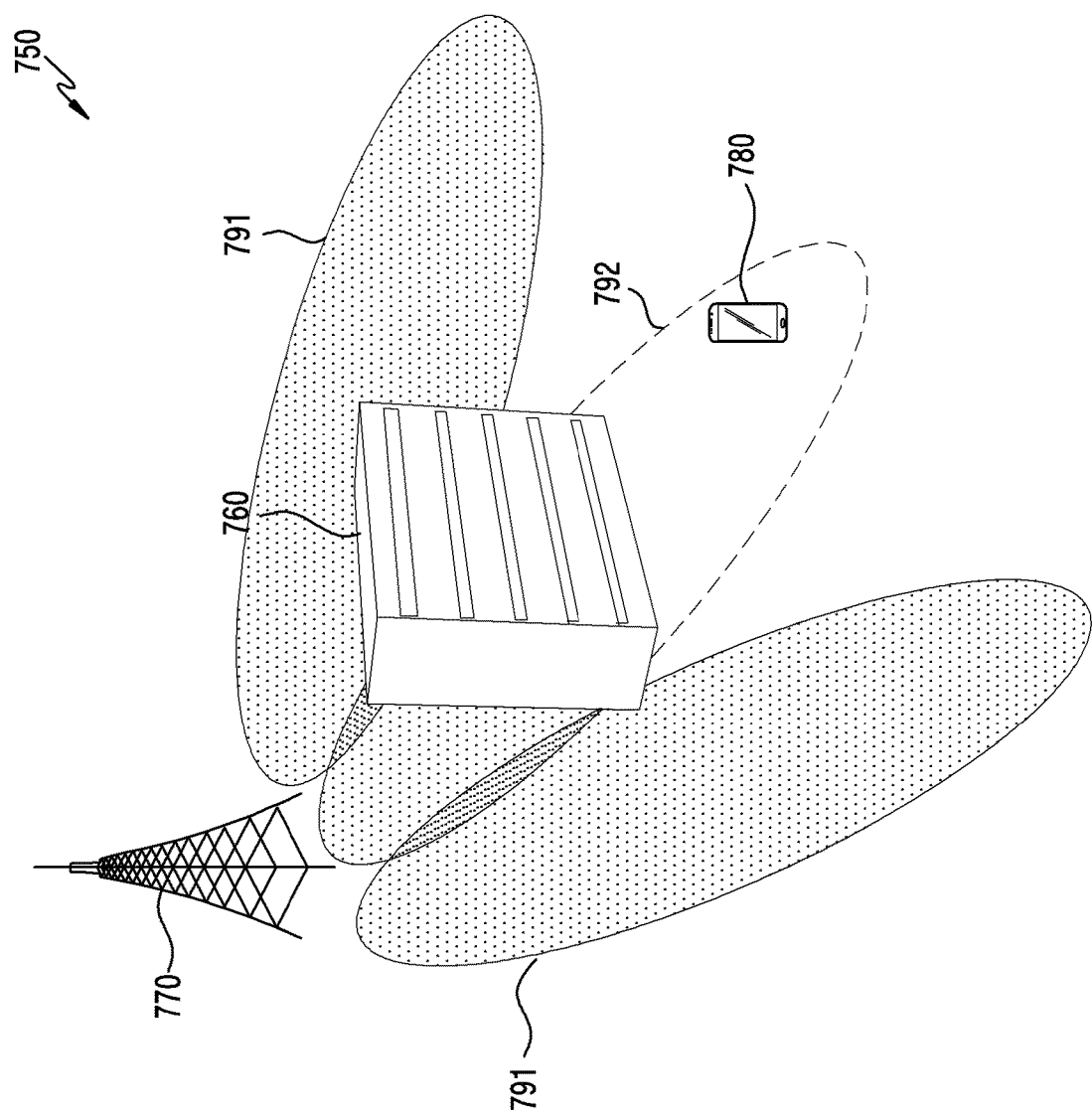
FIG. 7B illustrates another example of self-organizing beamforming in a wireless communication system according to various embodiments of the disclosure.

FIG. 7B illustrates another example of self-organizing beamforming in a wireless communication system according to various embodiments of the disclosure.

Referring to FIG. 7B, a wireless communication environment 750 may include a base station 770 and a terminal 780. The base station 770 may perform beamforming communication through a first beam 791, a second beam 792, and a third beam 793. In FIG. 7B, a situation in which an obstacle (e.g., a building 760) is located in a propagation path of the second beam 792 is described.

The terminal 780 may transmit a measurement report to the base station 770. The terminal may include a channel quality of a signal transmitted from the base station 770 through each beam. Hereinafter, for convenience of description, the channel quality is described by using an RSRP as an example.

The terminal 780 may measure a first RSRP of a signal transmitted through the first beam 791, a second RSRP of a signal transmitted through the second beam 792, and a third RSRP of a signal transmitted through the third beam 793.

The base station 770 may receive a measurement result for at least one of the first beam 791, the second beam 792, or the third beam 793. Although FIG. 7B illustrates only the terminal 780, the measurement may be performed by another terminal. Due to the presence of the building 760, a second RSRP value for the second beam 792 may not be measured as being high.

As statistical information of the second RSRP obtained through a measurement report or a measurement result for the second beam 792 is not received, the base station 770 may determine that the second beam 792 is not used for data transmission and reception through beamforming. The base station 770 may determine the second beam 792 as a free beam.

When a specific beam is determined as a free beam due to an obstacle such as the building 760 of FIG. 7B, beam deficiency may occur in a service area through the specific beam. For example, when the terminal 780 is not located within a coverage of a base station other than the base station 770, beam deficiency may occur in an area in which the terminal 780 is located. The operating device which controls the base station 770 may change a beamforming operation configuration for the base station 770 or another base station, and extend the current beam coverage so as to cover the area in which the beam deficiency has occurred. For example, the operating device may increase the number of RF chains operated by the base station 770. For another example, the operating device may form a beam through a band having a low frequency, so as to control the base station to cover a direction in which there are a lot of beams.

The examples implemented in FIGS. 7A and 7B are merely examples of self-organizing beamforming for optimizing the beamforming network, and are not limited to the specific situation of FIGS. 7A and 7B. The operations of the operating device, the base station, or the terminal for self-organizing beamforming according to various embodiments can be applied in other situations (e.g., three or more neighboring base stations).

Figure 8:
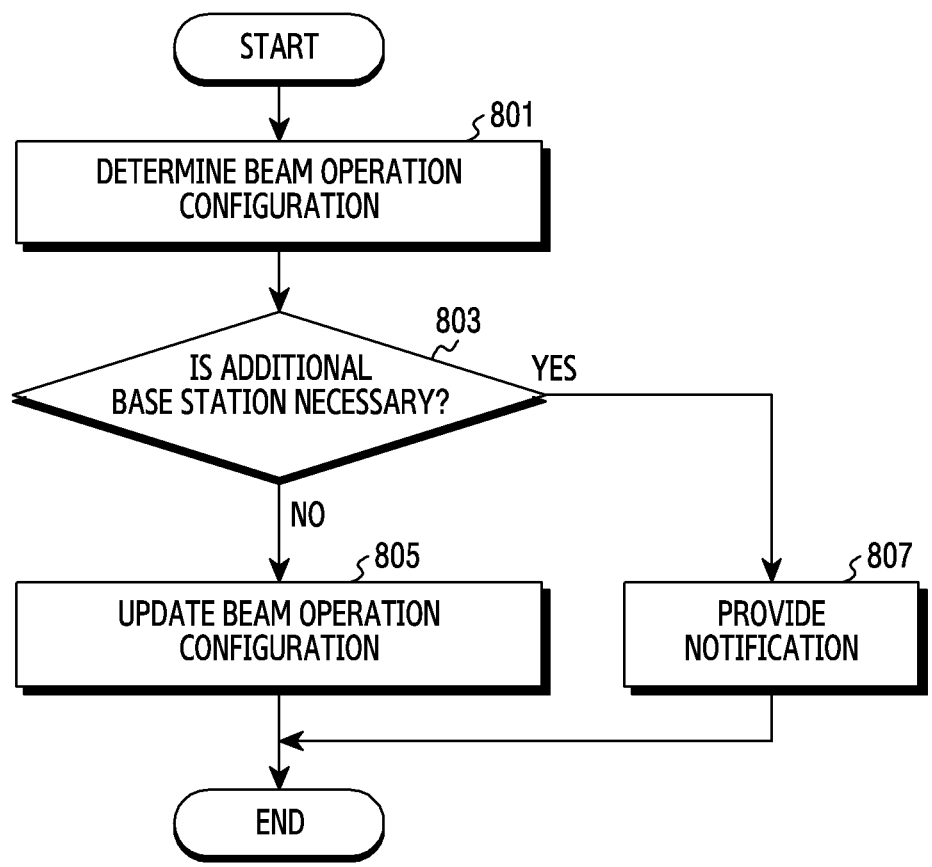
FIG. 8 is a flowchart of a beamforming network operating device for designing a beamforming network in a wireless communication system according to various embodiments of the disclosure.

FIG. 8 is a flowchart of a beamforming network operating device for designing a beamforming network in a wireless communication system according to various embodiments of the disclosure.

Referring to FIG. 8, in operation 801, the operating device may determine a beam operation configuration. The operating device may determine a coverage of the beamforming network through coverage monitoring. The operating device may determine the beam operation configuration, based on the determined coverage. The determined beam operation configuration may be a beam operation configuration for outputting the maximum beam coverage by using a beam control configuration of each of base stations connected to the operating device.

In operation 803, the operating device may determine whether an additional base station is necessary. That is, the operating device may determine whether an area which is not covered by a change of the beam operation configuration exists. For example, the operating device may search for a terminal to service a user's terminal newly subscribed to a service. The operating device may retrieve an identifier of the terminal, based on a measurement report received from each of the base stations connected to the operating device. For another example, the operating device may determine whether the terminal is located within the coverage of the beamforming network from location information of the terminal to service the terminal. The location information of the terminal may be input as prior information or obtained through a separate sensor.

When the operating device determines that an additional base station is not necessary, the operating device may perform operation 805. When the operating device determines that an additional base station is necessary, the operating device may perform operation 807.

In operation 805, the operating device may update the beam operation configuration. The operating device may update the beam operation configuration for at least one of the base stations connected to the operating device. The operating device may update beam control software located in the at least one base station.

In operation 807, the operating device may provide a notification when an additional base station is necessary. The notification may indicate information on an additional base station (e.g., the number of additional base stations, hardware information relating to the additional base station, a region in which the additional base station is required to be installed, and a beamforming area to be required to be covered by the additional base station). The region in which the additional base station is necessary may correspond to an area in which beam deficiency described with reference to FIGS. 6 to 7B occurs. In some embodiments, the operating device may indicate that the base station is required to be additionally installed, through a user interface (UI) in a display, and may display information on a region in which the additional installation is required. In some other embodiments, the operating device may transmit the information on the additional base station to another device (e.g., a service provider's server).

The operation for designing the beamforming network illustrated in FIG. 8 is illustrated as a one-time operation, but according to various embodiments, may be included in operation 605 of FIG. 6 and repeatedly performed. For example, the operating device may perform coverage monitoring to determine whether an additional base station is required whenever beam deficiency occurs.

Although not illustrated in FIG. 8, when an additional base station is required, RF planning may be performed. A network design tool may be used for the RF planning. For the beamforming network, information on a default configuration of the additional base station and related parameters may be provided to the operating device. The operating device may determine or change a beamforming operation configuration according to the default configuration of the additional base station. For the stability of network design, whenever the coverage monitoring is performed, the operating device may report an actual operating performance of the additional base station and update a configuration of the additional base station by using network design tool calibration.

Figure 9:
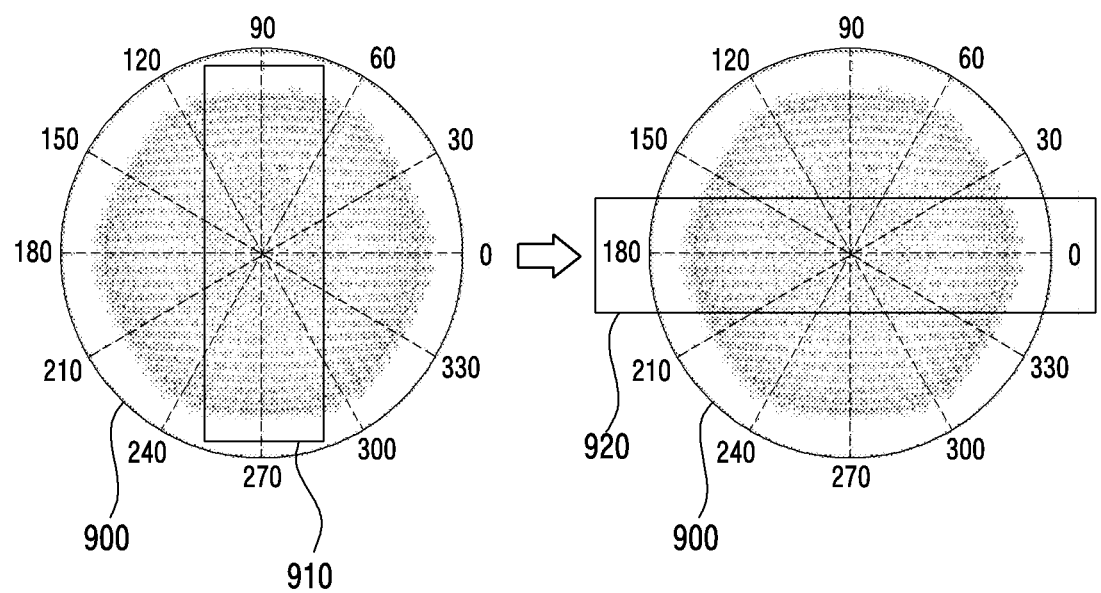
FIG. 9 illustrates an example of a change in a beamforming operation configuration in a wireless communication system according to various embodiments of the disclosure.

FIG. 9 illustrates an example of a change in a beamforming operation configuration in a wireless communication system according to various embodiments of the disclosure. An operating device or a base station may change a coverage of a beamforming network by changing a radiation range of an antenna operated by the base station, that is, a range of beams which may be used by the antenna.

Referring to FIG. 9, a beam organization chart 900 shows all of beams which can be formed. Each of the beams in the beam organization chart may be a 3-dimensional beam. Each beam may additionally take into account an elevation and an azimuth in addition to the existing directivity.

Each of the beams in the beam organization chart 900 may be determined based on at least one of a user requirement (e.g., a throughput or a data rate), a requirement (e.g., an antenna gain or an equivalent isotropic radiated power (EIRP)) of an antenna of each base station according to calculation of a link budget, an effective radiated power (ERP), the number of antenna elements within an antenna array, and a beam width.

The operating device may control a base station corresponding to an issue area (hereinafter, a steering base station) to identify beams located within an electric steering range (hereinafter, a steering range) in an antenna of the steering base station. The steering base station may perform beamforming communication through beams identified within a first steering range 910. Since each of the beams within the first steering range 910 has a larger displacement of the elevation than that of the azimuth, the steering base station may perform effective elevation beamforming.

The operating device may detect an environment change of the beamforming network according to coverage monitoring. For example, the operating device may receive an input for a new user next to a building located within the first steering range 910. In order to service a terminal of the new user, the operating device may provide a service to the next building by extending the coverage. The operating device may change a beam operation configuration to extend an azimuth coverage. The operating device may change a steering range of the steering base station from the first steering range 910 to a second steering range 920 in the beam operation configuration. Since each of beams within the second steering range 920 has a larger displacement of the azimuth than that of the elevation, the steering base station may perform effective azimuth beamforming. The operating device may operate beams having various azimuths in response to a change in a beamforming network environment. In this case, an elevation of a terminal located in the building located within the first steering range 910 may be assumed to be within a predetermined range (e.g., ±15°) from a reference line (0°).

Figure 10:
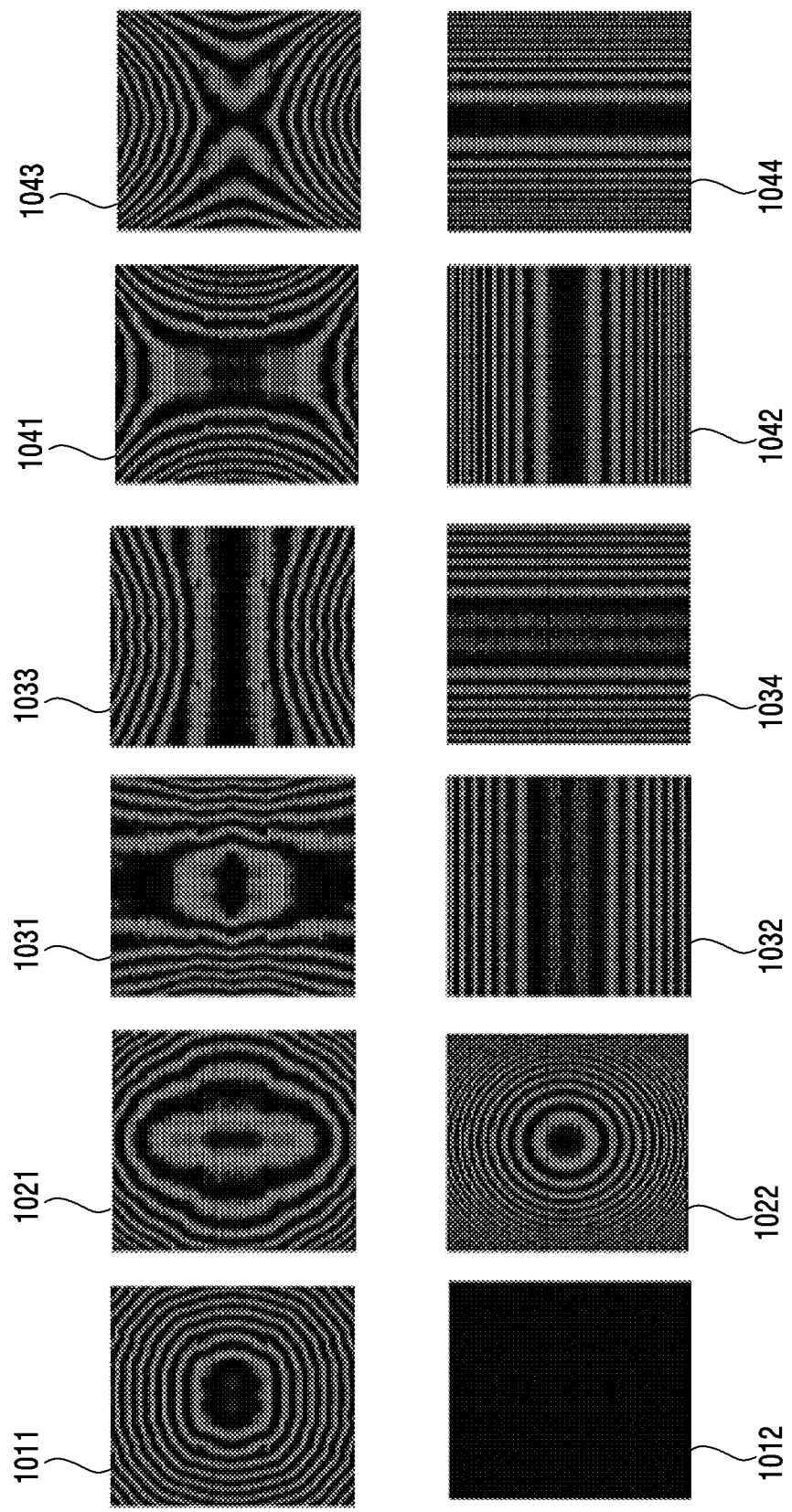
FIG. 10 illustrates another example of a change in a beamforming operation configuration in a wireless communication system according to various embodiments of the disclosure.

FIG. 10 illustrates another example of a change in a beamforming operation configuration in a wireless communication system according to various embodiments of the disclosure. When an antenna operated by a base station performs beamforming through a lens, the base station may change a coverage of a beamforming network by adaptively changing the lens. That is, the base station may shape a beam by adjusting an output phase.

Referring to FIG. 10, according to various embodiments, the antenna of the base station may perform beamforming through a first lens. FIG. 10 illustrates a lens phase mask 1011 of the first lens and an output phase mask 1012 of the first lens. The first lens may be referred to as a mirror lens. The base station may obtain a high gain instead of obtaining a relatively narrow coverage in an elevation range and an azimuth range through the first lens. The base station may perform beamforming in a fixed system (e.g., a backhaul) network through the first lens.

According to various embodiments, the antenna of the base station may perform beamforming through a second lens. FIG. 10 illustrates a lens phase mask 1021 of the second lens and an output phase mask 1022 of the second lens. The second lens may be referred to as a 2D parabola lens. The base station may obtain a relatively wide coverage in the elevation range and the azimuth range, instead of obtaining a low gain through the second lens. The base station may perform beamforming through the second lens when attempting to extend a coverage in all directions.

According to various embodiments, the antenna of the base station may perform beamforming through a third lens. FIG. 10 illustrates lens phase masks 1031 and 1033 of the third lens and output phase masks 1032 and 1034 of the third lens. The third lens may be referred to as a straight lens. The base station may obtain a high gain through the third lens instead of obtaining a relatively narrow coverage in one of the elevation range and the azimuth range. The base station may perform beamforming through the third lens when attempting to extend a coverage in a specific direction (e.g., horizontal or vertical).

According to various embodiments, the antenna of the base station may perform beamforming through a fourth lens. FIG. 10 illustrates lens phase masks 1041 and 1043 of the fourth lens and output phase masks 1042 and 1044 of the fourth lens. The fourth lens may be referred to as a hyperbolic lens. The base station may obtain a high gain through the fourth lens instead of obtaining a relatively narrow coverage in one of the elevation range and the azimuth range. The base station may perform beamforming through the fourth lens when attempting to extend a coverage in a specific direction (e.g., horizontal or vertical).

In the disclosure, expressions of greater than or equal to and less than or equal to have been used to determine whether a specific state occurs, but the expressions are merely a description of an example and does not exclude a description of expressions of excess or deficiency. The condition described as "greater than or equal to" can be replaced with "above", the condition described as "less than or equal to" can be replaced with "below", and the condition described as "greater than or equal to and below" can be replaced with "above and less than or equal to".

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The invention claimed is:

1. A method for an operating device connected to a base station set in a wireless communication system, the method comprising:
   identifying a first coverage of beams provided by the base station set according to a first beam operation configuration of the base station set; and
   changing from the first beam operation configuration to a second beam operation configuration based on identifying that a number of one or more beams which are available to a terminal in a first area is greater than or equal to a reference of a beam overflow,
   wherein the first area is determined based on the first coverage, and
   wherein the second beam operation configuration provides a change of a configuration of a beam of the one or more beams to provide a service in a second area different from the first area.

2. The method as claimed in claim 1, wherein the identifying of the first coverage of beams provided by the base station set comprises:
   identifying the first coverage of beams provided by the base station set, based on a measurement of reference signals transmitted from the base station set, and
   wherein the reference signals are transmitted through different beams from the one base station set.

3. The method as claimed in claim 2, further comprising:
   identifying whether another terminal is located outside the first coverage, based on the measurement and
   determining location of the another terminal as the second area in response to identifying the another terminal is located outside the first coverage based on the measurement.

4. The method as claimed in claim 3, wherein the identifying of whether the another terminal is located outside the first coverage comprises:
   when the measurement is not performed by the another terminal, identifying that the another terminal is not located outside the first coverage, and
   when the measurement is performed by the another terminal, identifying that the another terminal is located outside the first coverage.

5. The method as claimed in claim 4, wherein the identifying of whether the another terminal is located outside the first coverage comprises identifying whether the measurement is performed by the another terminal, according to whether a message for the measurement comprises an identifier of the another terminal.

6. The method as claimed in claim 2, wherein each of the one or more beams which are available to the terminal corresponds to a reference signal in which a reception signal strength of one of the reference signals exceeds a quality threshold value.

7. The method as claimed in claim 1, wherein the changing from the first beam operation configuration to the second beam operation configuration comprises changing a lens of an antenna of a first base station among the base station set, and wherein the antenna is an active lens antenna.

8. The method as claimed in claim 1, wherein the changing from the first beam operation configuration to the second beam operation configuration comprises changing a beam width of at least one of beams operated by the base station set.

9. The method as claimed in claim 1, wherein the changing of from the first beam operation configuration to the second beam operation configuration comprises changing a number of radio frequency (RF) chains of a second base station among the base station set.

10. The method as claimed in claim 1, further comprising:
identifying a second coverage of the beams through the second beam operation configuration; and
when another terminal is located outside the second coverage, transmitting a notification message indicating that addition of a new base station is required.

11. A base station in a wireless communication system, comprising:
at least one transceiver; and
at least one processor coupled to the at least one transceiver,
wherein the at least one processor is configured to:
identify a first coverage of beams provided by the base station set according to a first beam operation configuration of the base station, based on a measurement report received from each of terminals connected to the base station, and
change from the first a-beam operation configuration to a second beam operation configuration based on identifying that a number of beams which are available to a terminal in a first area is greater than or equal to a reference of a beam overflow,
wherein the first area is determined based on the first coverage, and
wherein the second beam operation configuration provides a change of a configuration of a beam of the one or more beams to provide a service in a second area different from the first area.

12. An operating device connected to a base station set in a wireless communication system, comprising:
at least one transceiver; and
at least one processor coupled to the at least one transceiver,
wherein the at least one processor is configured to:
identify a first coverage of beams provided by the base station set according to a first beam operation configuration of the base station set, and
change from the first beam operation configuration to a second beam operation configuration based on identifying that a number of one or more beams which are available to a terminal in a first area is greater than or equal to a reference of a beam overflow,
wherein the first area is determined based on the first coverage, and
wherein the second beam operation configuration provides a change of a configuration of a beam of the one or more beams to provide a service in a second area different from the first area.

13. The operating device as claimed in claim 12,
wherein the at least one processor is, to identify the first coverage of beams provided by the base station set, configured to:
identify the first coverage of beams provided by the base station set, based on a measurement of reference signals transmitted from the base station set, and
wherein the reference signals are transmitted through different beams from the base station set.

14. The operating device as claimed in claim 13, wherein the at least one processor is further configured to:
identify whether another terminal is located outside the first coverage, based on the measurement, and
determine location of the another terminal as the second area in response to identifying the another terminal is located outside the first coverage based on the measurement.

15. The operating device as claimed in claim 14, wherein the at least one processor is, to identify whether the another terminal is located outside the first coverage, configured to:
when the measurement is not performed by the another terminal, identify that the another terminal is not located outside the first coverage, and
when the measurement is performed by the another terminal, determine that the another terminal is located outside the first coverage.

16. The operating device as claimed in claim 15, wherein the at least one processor is, to identify whether the another terminal is located outside the first coverage, configured to:
identify whether the measurement is performed by the another terminal, according to whether a message for the measurement comprises an identifier of the another terminal.

17. The operating device as claimed in claim 13, wherein the at least one processor is further configured to:
identify a second coverage of the beams through the second beam operation configuration, and
when another terminal is located outside the second coverage, transmit a notification message indicating that addition of a new base station is required.

18. The operating device as claimed in claim 13, wherein each of the one or more beams which are available to the terminal corresponds to a reference signal in which a reception signal strength of one of the reference signals exceeds a quality threshold value.

19. The method as claimed in claim 1, wherein the reference of the beam overflow is determined based on at least one of a characteristic of a service, whether cooperative beamforming is performed, a number of neighboring terminals, a number of neighboring base stations, or a user configuration.

20. The method as claimed in claim 1, wherein the first area and the second area are determined based on a coverage information or a load information received from the base station set.

* * * * *